2,782,875
STEERING MECHANISM FOR CRAWLERS

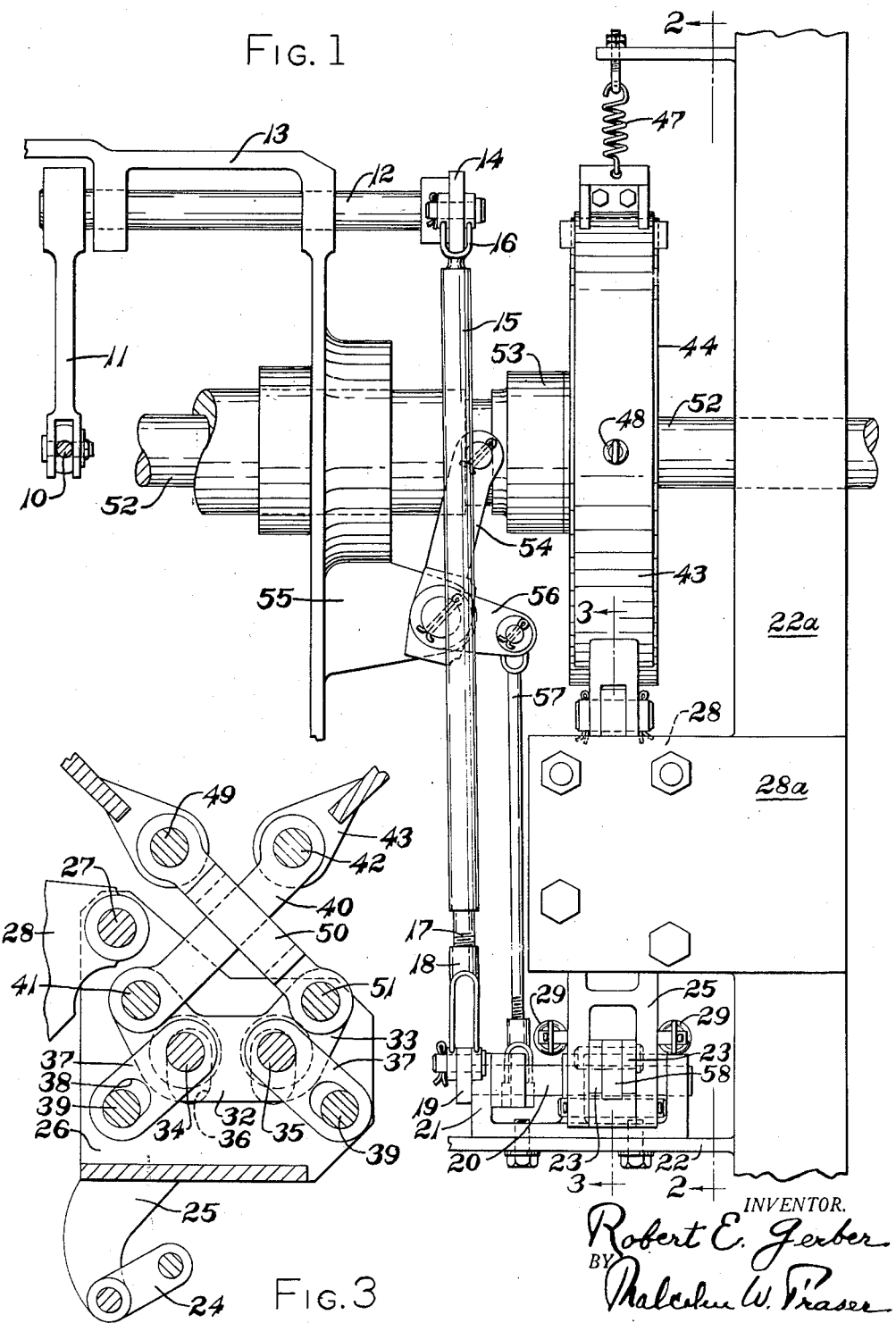

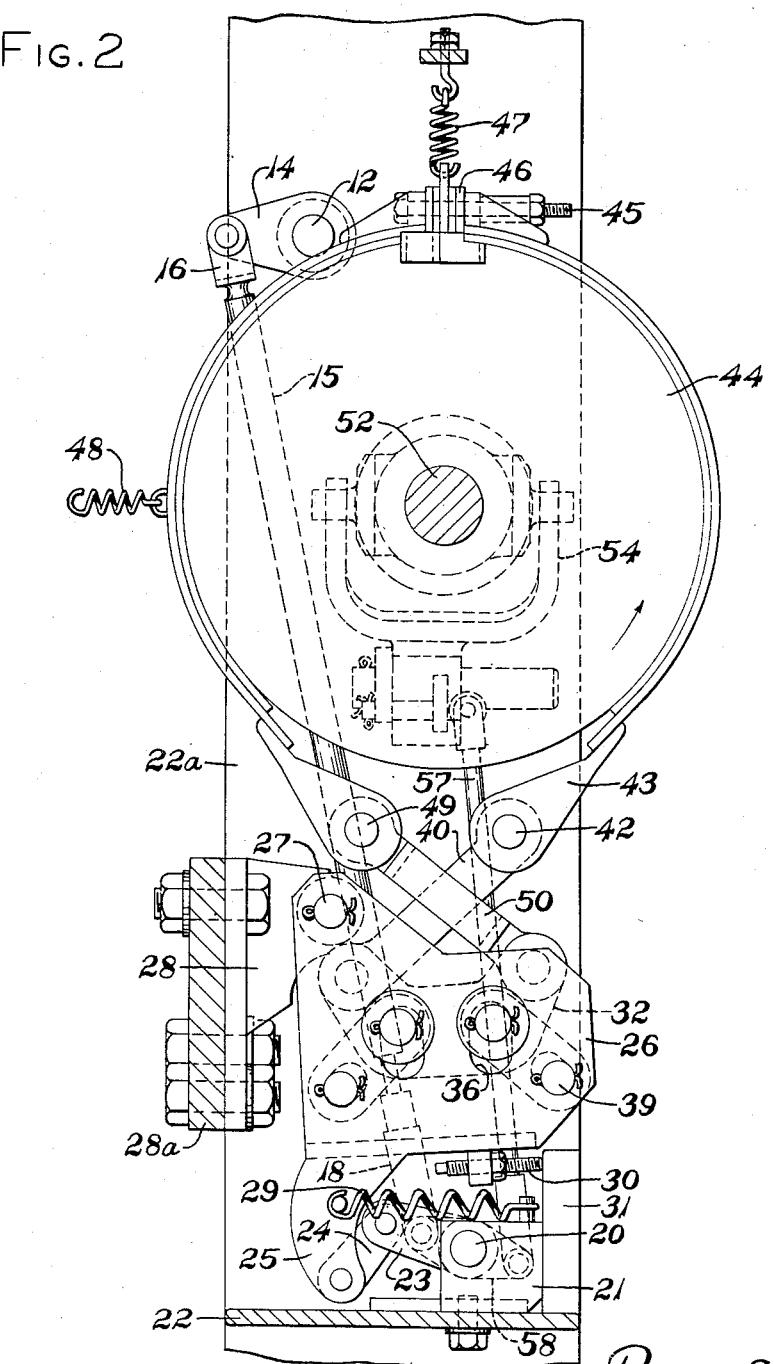

Robert E. Gerber, Indianapolis, Ind., assignor to Insley Manufacturing Corporation, Indianapolis, Ind., a corporation of Indiana Application April 13, 1955, Serial No. 501,127

7 Claims. (Cl. 188—77)

This invention relates to brake mechanisms but particularly of the type in which a brake band embraces a drum, and although the invention may be employed in many places, it is advantageously adapted for use in connection with the steering mechanism of a crawler mounted tractor.

In a tractor of the above type, steering is accomplished by steering clutches which disconnect the power from one or another crawler. A brake associated with each clutch is applied for completely stopping the associated crawler. When the vehicle embodies a crane, power shovel or the like, the brakes are both applied for holding the vehicle stationary and resist any tendency of the vehicle to move forwardly or rearwardly while work is being performed.

An object is to produce a new and improved brake mechanism for crawler driven vehicles so constructed and arranged that when applied, the brake reliably holds the vehicle stationary and any tendency of the vehicle to move automatically increases the gripping action of the brake band against the drum on which it is mounted.

Another object is to produce a brake mechanism of the band type in which the ends of the bands are connected by a link and lever assembly so constructed and arranged that when the band is applied, any slight movement of the brake drum in one direction or the other automatically increases the snubbing action of the band, thereby augmenting the wrapping effect normal to this type of brake.

Other objects and advantages of the invention will hereinafter appear and for purposes of illustration but not of limitation, an embodiment of the invention is shown on the accompanying drawings in which Figure 1 is a fragmentary side elevation showing a portion of the under frame of a crawler driven machine and showing the brake and clutch actuating mechanisms;

Figure 2 is a sectional view substantially on the line 2—2 of Figure 1, the brake being in its released position; and Figure 3 is a sectional view substantially on the line 3—3 of Figure 2.

The illustrated embodiment of the invention comprises a conjointly related clutch and brake mechanism for a crawler driven machine, such for example as a power operated crane or shovel which, when in operation must be securely held in its stationary position. The drawings illustrate the mechanism as used on one side of the machine for controlling the crawler unit on that side, it being understood that a similar mechanism is disposed on the other side of the machine for controlling the adjacent crawler unit. Referring particularly to Figure 1, a rod 10 extends vertically from the cab (not shown) of the machine and to which a suitable control lever is secured, as will be readily understood by those skilled in this art. The lower end of the control rod which is mounted for up and down movement, is pivoted at its lower end to the forked end of a lever 11, the opposite end of which is suitably secured to a transverse operating shaft 12. The shaft 12 rotates in suitable bearings on a stationary bracket arm 13 fixed to the machine frame.

Fixed at one end to an end portion of the shaft 12 is an arm 14, the outer end of which is pivoted to a vertically disposed brake operating rod 15, the latter having a yoke 16 at its upper end. To provide for length adjustment, the lower end of the brake rod 15 has a screw threaded connection 17 with a yoke 18, which is pivotally connected to an arm 19 secured at its opposite end to a rock shaft 20 which rotates in bearings in a stationary mounting bracket 21 bolted to a rigid support 22 on a beam 22a forming a part of the machine frame.

Secured at one end to the rock shaft 20 and spaced laterally from each other is a pair of toggle arms 23, the outer ends of which are pivoted respectively to toggle arms 24. The opposite ends of the toggle arms 24 are pivoted respectively to a pair of laterally spaced rigid depending extensions 25 which are integral with a housing bracket 26. The bracket 26 is of unitary design and is formed with a pair of laterally spaced parallel side plates. As shown, the housing bracket 26 at the left hand side has an upwardly extending portion which is pivoted on an anchor pin 27, thus enabling the housing bracket to pivot or rock about the pin 27. The pin 27 is carried by a stationary support 28 which is securely bolted to a machine frame part 28a fixed to the beam 22a.

A pair of helical coil springs 29 are hooked at one of the ends over pins on the depending bracket extensions 25 and have their opposite ends secured in a suitable manner to the stationary bracket 21. As indicated on Figure 2, the coil springs 29 normally urge the bracket housing 26 to the right of the figure or in a counterclockwise direction and urge the toggles formed by the pairs of toggle arms 23 and 24 to their broken positions and thus, will hereinafter appear, urge the brake to its released position. The extent of movement of the housing bracket 26 is controlled by an adjustable set screw 30 which threads into a part of the bracket and abuts against a stationary frame part 31.

Arranged between the side plates of the housing bracket 26 is a generally V-shaped lever 32 formed with a horizontally disposed base portion and upwardly and outwardly inclined ends 33. In spaced relation on the horizontal portion of the lever 32 are pivot pins 34 and 35, the end portions of which extend into vertically elongate slots 36 respectively formed in each of the side plates of the bracket housing. Connected at their upper ends to the pins 34 and 35 respectively and inclining downwardly and outwardly in opposite directions are links 37. Each of the links 37 is formed adjacent its lower end with a longitudinally elongate slot 38 receiving a pin 39 whose ends are secured to the side plates of the bracket housing 26. This arrangement is such that the lever 32 can rock in one direction or the other about either the pin 34 or 35, enabling the other of the pins to rock downwardly in its respective slot 36. The slots 36 are somewhat larger transversely than the pin diameters to afford such arcuate or rocking movement of the pins.

Referring particularly to Figure 3, a link 40 is pivotally connected to the left hand upwardly inclined end 33 of the lever 32 by a pin 41 and the opposite end of the link 40 is connected by a pin 42 to a brake band 43, which encircles a brake drum 44 and carries a suitable lining. The brake band is in two sections suitably connected by a screw 45, there being a plurality of interposed shims 46 between the ends of the band sections to provide for adjustment relative to the drum. A centering spring 47 is connected at this point for the centering of the brake band relative to the drum and an additional spring 48 suitably attached at the side aids in the proper positioning of the brake band as is usual in assemblies of this character.

At the opposite end of the brake band is a pin 49 to connect it to one end of a link 50, whose opposite end is connected by a pin 51 to the other upwardly inclined end of the lever 32.

The brake drum 44 is keyed to the main operating shaft 52 which is suitably connected to drive the adjacent crawler unit but such connections are not shown since they form no part of the present invention but will be readily understood by those skilled in this art. For driving the shaft 52 is a driven jaw clutch 53 shiftable axially into and out of engagement with its complementary clutch part on the brake drum 44. Details of the drive are not shown since they are not considered necessary to an understanding of the embodiment of the invention. The jaw clutch is shifted by a yoke 54 which is formed on the end of one arm of a bell crank which is pivoted to a stationary bracket 55, the other bell crank arm being indicated at 56 is pivotally connected to a vertically disposed clutch rod 57. The lower end of the rod has length adjustment with a yoke pivoted to an arm 58 fixed to the rock shaft 20. As shown in Figure 1, the arm 58 is arranged between the toggle arms 23.

It will be understood that the brake is shown on the drawings in its released position. In order to apply the brake, the operating rod 10 is moved to swing the arm 11 so as to rotate the shaft 12 and arm 14 counterclockwise in Figure 2. Through the operation of the shaft 12 and brake rod 15 and arm 19, the shaft 20 is rocked to straighten out the toggles formed by the arms 23 and 24. This causes the housing bracket 26 to be rocked to the left (Figure 2) and place the coil springs 29 under tension. Such rocking movement of the housing bracket 26 about its pivot or anchor pin 27 pulls the brake band into snug engagement with the brake drum 44. This action takes place because of the force exerted on the link 40 pulling the brake band against the drum and resulting in a rocking of the V-shaped arm 32 about the pivot pin 34 and causing the right-hand end portion of the lever 32 to rock downwardly and consequently exerting a pull on the link 50. Thus both ends of the brake band are pulled by this action to effect the snug and intimate engagement between the lining of the brake band and the peripheral surface of the drum 44.

If the above brake mechanism is employed on a machine such as a crane, manifestly it must securely hold the brake drum from turning in either direction in order to prevent the machine from moving. If there is a tendency of the machine to move so that some movement is imparted to the brake drum 44, one end or the other of the brake band will exert a pull on its respective link which is transmitted through the lever 32 to the other link and cause the brake band to grip the brake drum more tightly. Thus braking is rendered effective not only from the wrapping effect of the brake band but also through the ratio of the linkage. This obtains in either direction of turning movement of the brake drum when the brake is in applied position.

It will be manifest that before the brake is applied, the jaw clutch 53 is moved out of operative engagement with the brake drum by the clutch rod 57, the bell crank comprising the arms 54 and 56, and the arm on the rock shaft 20. Thus the sequence of operations takes place both in applying and releasing the brake, the applying of the brake following the movement of the clutch out of operative position and the release of the brake being effected slightly before the clutch is operatively engaged with the brake drum. Steering of the vehicle is achieved by throwing out the clutch on one side or the other and applying the associated brake to hold one crawler and allow the other to turn the vehicle.

Numerous changes in details of construction, arrangement and operation may be effected without departing from the spirit of the invention, especially as defined in the appended claims.

What I claim is:

1. In brake mechanism having a brake drum and a brake band embracing the drum, the improvement which comprises a link and lever assembly interconnecting the ends of the brake band, a pivotally mounted spring tensioned bracket for said assembly normally held by the spring in brake released position, and means for rocking said bracket, said last means including a toggle which, when straightened rocks said bracket to apply the brake and tensions the spring.

2. In brake mechanism having a brake drum and a brake band embracing the drum, the improvement which comprises a pivoted bracket, a substantially V-shaped lever on said bracket connected at its opposite ends to the ends of the brake band respectively, a pair of laterally spaced pivot pins, for said lever, said bracket being slotted vertically to receive said pivot pins respectively and the slots affording limited lateral movement of the pins, and means for rocking said bracket to effect brake operation.

3. In brake mechanism having a brake drum and a brake band embracing the drum, the improvement which comprises a pivoted bracket, a substantially V-shaped lever on said bracket connected at its opposite ends to the ends of the brake band respectively, a pair of laterally spaced pivot pins for said lever, means to enable one pin to rock vertically when the other pin is employed as the pivot for said lever, and means for actuating said bracket.

4. In brake mechanism having a brake drum and a brake band embracing the drum, the improvement which comprises a pivoted bracket, a substantially V-shaped lever on said bracket connected at its opposite ends to the ends of the brake band respectively, a pair of laterally spaced pivot pins for said lever, means to enable one pin to rock vertically when the other pin is employed as the pivot for said lever, diagonal disposed links providing lost motion connections between said pivot pins and lower portions of said bracket respectively, and means for actuating said bracket.

5. In brake mechanism having a brake drum and a brake band embracing the drum, the improvement which comprises a bracket pivotally mounted at one side adajcent its upper end, a lever having a horizontally disposed intermediate portion and upwardly extending end portions, link connections between the end portions of said lever and the ends of said brake band respectively, a pair of laterally spaced pivot members for said intermediate lever portion, means providing lost motion between said pivot members and said bracket enabling rocking movement of one pivot member when the other constitutes the pivot for said lever, and means to actuate said bracket.

6. In brake mechanism having a brake drum and a brake band embracing the drum, the improvement which comprises a bracket pivotally mounted at one side adjacent its upper end, a lever having a horizontally disposed intermediate portion and upwardly extending end portions, link connections between the end portions of said lever and the ends of said brake band respectively, a pair of laterally spaced pivot members for said intermediate lever portion, means providing lost motion between said pivot members and said bracket enabling rocking movement of one pivot member when the other constitutes the pivot for said lever, spring means biasing said bracket, and means for rocking said bracket in opposition to said spring means.

7. In brake mechanism having a brake drum and a brake band embracing the drum, the improvement which comprises a bracket pivotally mounted at one side adjacent its upper end, a lever having a horizontally disposed intermediate portion and upwardly extending end portions, link connections between the end portions of said lever and the ends of said brake band respectively, a pair of laterally spaced pivot pins for said intermediate lever portion, said bracket having vertically elongate slots receiving said pivot pins respectively and slightly larger transversely than the diameter of said pins, diagonally disposed link means between each pin and the lower portion of said bracket, spring means urging said bracket in the direction to release said brake band, and means to rock said bracket in the opposite direction.

References Cited in the file of this patent

UNITED STATES PATENTS

| | | |
|---|---|---|
| 946,057 | Knowles | Jan. 11, 1910 |
| 1,003,621 | Lincoln | Sept. 19, 1911 |
| 2,257,722 | Maier | Sept. 30, 1941 |
| 2,678,703 | Williams | May 18, 1954 |

FOREIGN PATENTS

| | | |
|---|---|---|
| 61,896 | Austria | Oct. 25, 1913 |